United States Patent
Sato et al.

(10) Patent No.: US 12,509,555 B2
(45) Date of Patent: Dec. 30, 2025

(54) METHOD FOR PRODUCING POLYARYLENE SULFIDE

(71) Applicant: Kureha Corporation, Tokyo (JP)

(72) Inventors: Takeshi Sato, Tokyo (JP); Yoshinori Suzuki, Tokyo (JP)

(73) Assignee: Kureha Corporation, Tokyo (JP)

( * ) Notice: Subject to any disclaimer, the term of this patent is extended or adjusted under 35 U.S.C. 154(b) by 769 days.

(21) Appl. No.: 17/757,811

(22) PCT Filed: Dec. 16, 2020

(86) PCT No.: PCT/JP2020/047030
§ 371 (c)(1),
(2) Date: Jun. 21, 2022

(87) PCT Pub. No.: WO2021/131985
PCT Pub. Date: Jul. 1, 2021

(65) Prior Publication Data
US 2023/0033026 A1  Feb. 2, 2023

(30) Foreign Application Priority Data
Dec. 26, 2019 (JP) .................................. 2019-237137

(51) Int. Cl.
  *C08G 75/0281*  (2016.01)
  *C08G 75/0209*  (2016.01)
  *C08G 75/0259*  (2016.01)

(52) U.S. Cl.
  CPC ..... *C08G 75/0281* (2013.01); *C08G 75/0209* (2013.01); *C08G 75/0259* (2013.01)

(58) Field of Classification Search
None
See application file for complete search history.

(56) References Cited

U.S. PATENT DOCUMENTS

| | | | |
|---|---|---|---|
| 7,220,817 B2 | 5/2007 | Matsuzaki et al. | |
| 7,569,656 B2 | 8/2009 | Kagoshima et al. | |
| 2004/0249118 A1 | 12/2004 | Kagoshima et al. | |
| 2005/0215759 A1 | 9/2005 | Matsuzaki et al. | |
| 2018/0171078 A1 | 6/2018 | Kimura et al. | |
| 2019/0055358 A1 | 2/2019 | Konno et al. | |
| 2020/0024402 A1 | 1/2020 | Konno et al. | |

FOREIGN PATENT DOCUMENTS

| | | |
|---|---|---|
| JP | 2001-089569 A | 4/2001 |
| JP | 2003-246858 A | 9/2003 |
| JP | 2004-51732 A | 2/2004 |
| KR | 20180004229 A | 1/2018 |
| KR | 20180090886 A | 8/2018 |
| KR | 20190082955 A | 7/2019 |
| WO | 2003/029328 A1 | 4/2003 |
| WO | 2018/147233 A1 | 8/2018 |

OTHER PUBLICATIONS

English language machine translation of JP 2003-246858 (Year: 2003).*
Office Action for KR1020227021415, mailed Mar. 26, 2024, 6 pages.
English translation of Office Action for KR1020227021415, mailed Mar. 26, 2024, 6 pages.
Office Action for JP Patent Application No. 2021-567346, mailed Aug. 8, 2023, 1 page.
English translation of the Office Action for JP Patent Application No. 2021-567346, mailed Aug. 8, 2023, 2 pages.
Office Action for JP Patent Application No. 2021-567346, mailed Apr. 4, 2023, 2 pages.
English translation of the Office Action for JP Patent Application No. 2021-567346, mailed Apr. 4, 2023, 5 pages.

* cited by examiner

*Primary Examiner* — Megan McCulley
(74) *Attorney, Agent, or Firm* — Abel Schillinger, LLP

(57) ABSTRACT

A method for producing a polyarylene sulfide comprising: initiating a polymerization reaction by heating a mixture containing an organic polar solvent, a sulfur source, water, a polyhaloaromatic compound, and an alkali metal hydroxide in the presence of at least one auxiliary agent selected from the group consisting of carboxylates and the like, to form a reaction mixture containing a prepolymer having a conversion rate of a polyhaloaromatic compound of 50 mol % or greater, then a phase separation agent addition step of adding a phase separation agent into the reaction mixture, then continuing the polymerization reaction, and then cooling the reaction mixture, in the cooling step, the coolant being added to the reaction mixture at a temperature that is at least 5° C. higher than a maximum thickening temperature and lower than 250° C., and a cooling rate at the maximum thickening temperature being 2.2° C./min or higher and 3.9° C./min or lower.

3 Claims, No Drawings

METHOD FOR PRODUCING POLYARYLENE SULFIDE

TECHNICAL FIELD

The present invention relates to a method for producing a polyarylene sulfide.

BACKGROUND ART

A polyarylene sulfide (hereinafter, also referred to as "PAS"), represented by polyphenylene sulfide (hereinafter, also referred to as "PPS"), is an engineering plastic having excellent heat resistance, chemical resistance, flame retardancy, mechanical strength, electrical characteristics, dimensional stability, and the like. A PAS is used in a wide variety of technical fields including electrical instruments, electronic instruments, automobile instruments, and packaging materials, because a PAS can be formed into various molded products, films, sheets, and fibers by general melting processing methods such as extrusion molding, injection molding and compression molding.

Especially in the automobile-related field, PASs have been widely used as metal substitutes for weight reduction of automobiles. A high molecular weight PAS having a high toughness has been demanded for use on vehicle. Patent Documents 1 and 2 describe methods for producing a granular PAS as a high molecular weight PAS.

CITATION LIST

Patent Document

Patent Document 1: JP 2001-089569 A
Patent Document 2: JP 2004-051732 A

SUMMARY OF INVENTION

Technical Problem

In recent years, as demands for granular PASs are increased, reduction in time for granular PAS production has been demanded. However, in a known production method, since slow cooling is required in a cooling process for forming a granular PAS by granulation to control the particle size of the granular PAS and enhance the purity, a long period of time is required for the cooling process.

Meanwhile, it is known that a high molecular weight PAS can be obtained in a short period of time when the PAS is produced in the presence of a polymerization auxiliary agent. However, the resulting PAS tends to have an increased average particle size, and as a result, piping of a PAS production apparatus and the like tends to be clogged. Furthermore, to remove the clogged PAS, washing of the piping requires a lot of time.

The present invention was completed in light of the problems described above, and an object of the present invention is to provide a method for producing a PAS, which can reduce the time required for a cooling step to form a granular PAS and suppress increase in the average particle size of the resulting granular PAS.

Solution to Problem

The present inventors found that the object described above can be achieved by performing a first polymerization step, a phase separation agent addition step, a second polymerization step, and a cooling step in this order in the presence of at least one auxiliary agent selected from the group consisting of carboxylates and the like in the production of a PAS and, in the cooling step, by adding a coolant to the reaction mixture at a temperature in a predetermined range and setting a cooling rate at a maximum thickening temperature to 2.2° C./min or higher and 6.0° C./min or lower, and thus completed the present invention.

The method for producing a PAS according to an embodiment of the present invention includes:

a first polymerization step of initiating a polymerization reaction by heating a mixture containing an organic polar solvent, a sulfur source, water, to a polyhaloaromatic compound, and an alkali metal hydroxide in the presence of at least one auxiliary agent selected from the group consisting of carboxylate, alkali metal chloride, organic sulfonate, alkali metal sulfate, alkaline earth metal oxide, alkali metal phosphate, and alkaline earth metal phosphate, to form a reaction mixture containing a prepolymer having a conversion rate of a polyhaloaromatic compound of 50 mol % or greater, a phase separation agent addition step of adding a phase separation agent into the reaction mixture after the first polymerization step, a second polymerization step of continuing the polymerization reaction after the phase separation agent addition step, and a cooling step of cooling the reaction mixture after the second polymerization step, in the cooling step, the coolant being added to the reaction mixture at a temperature that is at least 5° C. higher than the maximum thickening temperature and lower than 250° C., and a cooling rate at the maximum thickening temperature being 2.2° C./min or higher and 6.0° C./min or lower.

In the method for producing a PAS according to an embodiment of the present invention, in the cooling step, a coolant may be added to the reaction mixture.

In the method for producing a PAS according to an embodiment of the present invention, the coolant may be water and/or ice.

In the method for producing a PAS according to an embodiment of the present invention, at the maximum thickening temperature, a content of the coolant in the reaction mixture may be 2.7 mol or greater and 6.0 mol or less with respect to 1 mol of the sulfur source.

Advantageous Effects of Invention

According to an embodiment of the present invention, a method for producing a PAS, which can reduce the time required for a cooling step to form a granular PAS and suppress increase in the average particle size of the resulting granular PAS, can be provided. As a result, piping of a PAS production apparatus and the like is less likely to be clogged and, because need for removing the clogged PAS is reduced, time required for washing the piping can be shortened. From the above, totally, the granular PAS can be produced in a shorter period of time.

DESCRIPTION OF EMBODIMENTS

An embodiment of the method of producing PAS according to the present invention is described hereinafter. The method for producing a PAS of the present embodiment includes a first polymerization step, a phase separation agent addition step, a second polymerization step, and a cooling step as essential processes. The method for producing a PAS of the present embodiment may further include, for example, a water removal step, a preparation step, and a post-treatment step, as desired. Each of the materials used in an embodiment of the present invention is described in detail below, and each step is also described in detail below.

Organic Polar Solvent, Sulfur Source, Polyhaloaromatic Compound, and Alkali Metal Hydroxide As the organic polar solvent, the sulfur source, the polyhaloaromatic compound, and the alkali metal hydroxide, those typically used in the production of a PAS can be used. The organic polar solvent, the sulfur source, the polyhaloaromatic compound, and the alkali metal hydroxide may each be used alone or may be used as a mixture of two or more types as long as the combination can produce the PAS.

Examples of the organic polar solvent include organic amide solvents; aprotic organic polar solvents formed from organosulfur compounds; and aprotic organic polar solvents formed from cyclic organophosphorus compounds. Examples of the organic amide solvent include amide compounds, such as N,N-dimethylformamide and N,N-dimethylacetamide; N-alkylcaprolactam compounds, such as N-methyl-ε-caprolactam, N-alkylpyrrolidone compounds or N-cycloalkylpyrrolidone compounds, such as N-methyl-2-pyrrolidone (hereinafter, also referred to as "NMP") and N-cyclohexyl-2-pyrrolidone; N,N-dialkylimidazolidinone compounds, such as 1,3-dialkyl-2-imidazolidinone, tetraalkyl urea compounds, such as tetramethyl urea; and hexaalkylphosphate triamide compounds, such as hexamethyl phosphate triamide. Examples of the aprotic organic polar solvent formed from an organosulfur compound include dimethyl sulfoxide and diphenyl sulfone. Examples of the aprotic organic polar solvent formed from a cyclic organophosphorus compound include 1-methyl-1-oxophosphorane. Among these, from the viewpoints, such as availability and handleability, the organic polar solvent is preferably an organic amide solvent; more preferably an N-alkyl pyrrolidone compound, an N-cycloalkyl pyrrolidone compound, an N-alkyl caprolactam compound, and an N,N-dialkyl imidazolidinone compound; even more preferably NMP, N-methyl-ε-caprolactam, and 1,3-dialkyl-2-imidazolidinone, and particularly preferably NMP.

The amount of the organic polar solvent to be used is preferably from 1 to 30 mol, and more preferably from 3 to 15 mol, with respect to 1 mol of the sulfur source from the perspective of, for example, efficiency of the polymerization reaction.

Examples of the sulfur source include alkali metal sulfides, alkali metal hydrosulfides, and hydrogen sulfides, and alkali metal sulfides and alkali metal hydrosulfides are preferred. The sulfur source can be handled, for example, in a state of any one of aqueous slurry or aqueous solution, and is preferably in a state of an aqueous solution from the perspective of handling such as measurability and transportability. Examples of the alkali metal sulfides include lithium sulfide, sodium sulfide, potassium sulfide, rubidium sulfide, and cesium sulfide. Examples of the alkali metal hydrosulfides include lithium hydrosulfide, sodium hydrosulfide, potassium hydrosulfide, rubidium hydrosulfide, and cesium hydrosulfide.

The polyhaloaromatic compound refers to an aromatic compound in which two or more hydrogen atoms directly bonded to an aromatic ring are substituted by halogen atoms, and may be an aromatic compound in which two hydrogen atoms directly bonded to an aromatic ring are substituted by halogen atoms (i.e., dihaloaromatic compound) or an aromatic compound in which three or more hydrogen atoms directly bonded to an aromatic ring are substituted by halogen atoms (also referred to as "polyhaloaromatic compound having three or more halogen substitutions").

Examples of the polyhaloaromatic compound include dihaloaromatic compounds, such as o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide, and dihalodiphenyl ketone; and polyhaloaromatic compounds having three or more halogen substitutions, such as 1,2,3-trichlorobenzene, 1,2,4-trichlorobenzene, 1,3,5-trichlorobenzene, hexachlorobenzene, 1,2,3,4-tetrachlorobenzene, 1,2,4,5-tetrachlorobenzene, 1,3,5-trichloro-2,4,6-trimethylbenzene, 2,4,6-trichlorotoluene, 1,2,3-trichloronaphthalene, 1,2,4-trichloronaphthalene, 1,2,3,4-tetrachloronaphthalene, 2,2',4,4'-tetrachlorobiphenyl, 2,2',4,4'-tetrachlorobenzophenone, and 2,4,2'-trichlorobenzophenone. The halogen atom means each atom of fluorine, chlorine, bromine, or iodine, and the two or more halogen atoms in the polyhaloaromatic compound may be the same or different. Among these, from the viewpoints, such as availability and reactivity, the polyhaloaromatic compound is preferably a p-dihalobenzene, a m-dihalobenzene, and a mixture of both, more preferably a p-dihalobenzene, and particularly preferably a p-dichlorobenzene (hereinafter also referred to as "pDCB").

The used amount of the polyhaloaromatic compound is preferably from 0.90 to 1.50 mol, more preferably from 0.92 to 1.10 mol, and even more preferably from 0.95 to 1.05 mol, with respect to 1 mol of the charged amount of the sulfur source. When the used amount is in the range described above, decomposition reactions are less likely to occur, a stable polymerization reaction can be easily performed, and a high molecular weight polymer tends to be produced.

Examples of the alkali metal hydroxide include lithium hydroxide, sodium hydroxide, potassium hydroxide, rubidium hydroxide, and cesium hydroxide.

Water Removal Step

The water removal step is a step of discharging at least a part of distillate containing water from a system, containing a mixture of an organic polar solvent, a sulfur source, and an alkali metal hydroxide, to outside the system, before the preparation step. The polymerization reaction of the sulfur source and the polyhaloaromatic compound is affected, for example, promoted or inhibited, by the amount of water present in the polymerization reaction system. Therefore, the water content of the polymerization reaction system is preferably reduced by performing the water removal treatment before the polymerization so that the water content does not inhibit the polymerization reaction.

In the water removal step, the water removal is preferably performed by heating in an inert gas atmosphere. Water to be removed in the water removal step includes water contained in the raw materials charged in the water removal step, an aqueous medium of the aqueous mixture, and water produced by a side reaction between the raw materials.

The heating temperature in the water removal step is not particularly limited as long as the heating temperature is 300° C. or lower but is preferably from 100 to 250° C. The heating time is preferably from 15 minutes to 24 hours, and more preferably from 30 minutes to 10 hours.

In the water removal step, the water removal is performed until the water content reaches a predetermined range. That is, in the water removal step, it is preferable to remove water until the water content is preferably from 0.5 to 2.4 mol with respect to 1.0 mol of sulfur source (hereinafter, also referred to as "charged sulfur source" or "effective sulfur source") in a prepared mixture (described later). When the water content is too small in the water removal step, the water content needs to be adjusted to a desired content by adding water in the preparation step before the polymerization step.

Preparation Step

The preparation step is a process by which a mixture containing an organic polar solvent, a sulfur source, and a polyhaloaromatic compound is prepared. The mixture prepared in the preparation step is also referred to as "prepared mixture".

In the case where the water removal step is performed, the amount of the sulfur source in the prepared mixture (hereinafter, also referred to as "amount of charged sulfur source" or "amount of effective sulfur source") can be calculated by subtracting the molar quantity of the hydrogen sulfide volatilized in the water removal step from the molar quantity of the sulfur source charged as the raw material.

In the case where the water removal step is performed, as necessary, in the preparation step, an alkali metal hydroxide and water can be added to to the mixture remaining in the system after the water removal step. In particular, the alkali metal hydroxide can be added taking into account the amount of the hydrogen sulfide generated during the water removal and the amount of the alkali metal hydroxide generated during the water removal. Note that the number of moles of the alkali metal hydroxide is calculated based on the number of moles of the alkali metal hydroxide added in the preparation step. In the case where the water removal step is performed, the number of moles of the alkali metal hydroxide is calculated based on the number of moles of the alkali metal hydroxide added as needed in the water removal step and the number of moles of the alkali metal hydroxide generated simultaneously with generation of hydrogen sulfide in the water removal step. When the sulfur source contains an alkali metal sulfide, the number of moles of the alkali metal hydroxide per 1 mol of the sulfur source (charged sulfur source) is calculated in a manner that the number of moles of the alkali metal sulfide is included. When the sulfur source contains hydrogen sulfide, the number of moles of the alkali metal hydroxide per 1 mol of the sulfur source (charged sulfur source) is calculated in a manner that the number of moles of the generated alkali metal sulfide is included. However, the number of moles of the alkali metal hydroxide added for other purposes, such as the number of moles of the alkali metal hydroxide consumed in a reaction such as neutralization in the case where the organic carboxylic acid metal salt is used in a form of a combination of an organic carboxylic acid and an alkali metal hydroxide as a polymerization auxiliary agent and/or a phase separation agent, is not included in the number of moles of the alkali metal hydroxide per 1 mol of the sulfur source (charged sulfur source). Furthermore, for example, in the case where at least one acid selected from the group consisting of inorganic acids and organic acids is used for a reason, the number of moles of the alkali metal hydroxide required to neutralize the at least one acid is not included in the number of moles of the alkali metal hydroxide per 1 mol of the sulfur source (charged sulfur source).

In the prepared mixture, the used amount of each of the organic polar solvent and the polyhaloaromatic compound is set to be, for example, in a range specified in the above description related to the organic polar solvent and the polyhaloaromatic compound, with respect to 1 mol of the charged amount of the sulfur source.

First Polymerization Step

The first polymerization step is a process of initiating a polymerization reaction by heating a mixture containing an organic polar solvent, a sulfur source, water, a polyhaloaromatic compound, and an alkali metal hydroxide in the presence of at least one auxiliary agent selected from the group consisting of carboxylate, alkali metal chloride, organic sulfonate, alkali metal sulfate, alkaline earth metal oxide, alkali metal phosphate, and alkaline earth metal phosphate, to form a reaction mixture containing a prepolymer having a conversion rate of a polyhaloaromatic compound of 50 mol % or greater. In the first polymerization step, the polymerization reaction is performed in a reaction system in which a polymer to be produced is uniformly dissolved in the organic polar solvent. In the present specification, a reaction mixture means a mixture containing a reaction product generated by the above-mentioned polymerization reaction, and starts to be generated simultaneously with the initiation of the polymerization reaction.

To shorten the polymerization cycle time, the polymerization reaction method may be one that uses two or more reaction vessels.

In the first polymerization step, preferably, the polymerization reaction is initiated by heating the mixture prepared in the preparation step, that is, the prepared mixture, to a temperature of 170 to 270° C. to generate a prepolymer having a conversion rate of the polyhaloaromatic compound of 50 mol % or greater. The polymerization temperature in the first polymerization step is preferably selected from the range of 180 to 265° C. in order to suppress a to side reaction or a decomposition reaction.

The polyhaloaromatic compound conversion ratio is preferably from 50 to 98%, more preferably from 60 to 97%, even more preferably from 65 to 96%, and particularly preferably from 70 to 95%. The conversion ratio of the polyhaloaromatic compound can be calculated by determining the amount of the polyhaloaromatic compound remaining in the reaction mixture by gas chromatography and then performing a calculation based on this remaining amount of the polyhaloaromatic compound, the charged amount of the polyhaloaromatic compound, and the charged amount of the sulfur source.

During the polymerization reaction, the amount of at least one of water or the organic polar solvent may be changed. For example, water can be added to the reaction system during the polymerization. However, in the first polymerization step, usually, it is preferred to initiate the polymerization reaction using the prepared mixture prepared in the preparation step and terminate the reaction in the first polymerization step.

At the time of the initiation of the first polymerization step, the water content is preferably from 0.5 to 2.4 mol, more preferably from 0.5 to 2.0 mol, and even more preferably from 1.0 to 1.5 mol, with respect to 1.0 mol of the sulfur source. The water content in the above range at the time of the initiation of the first polymerization step allows the sulfur source to be solubilized in the organic polar solvent, and allows the reaction to be favorably advanced.

The first polymerization step is performed in the presence of at least one auxiliary agent selected from the group consisting of carboxylate, alkali metal chloride, organic sulfonate, alkali metal sulfate, alkaline earth metal oxide, alkali metal phosphate, and alkaline earth metal phosphate. Accordingly, a high molecular weight PAS is likely to be obtained in the method for producing a PAS according to an embodiment of the present invention. From the perspectives of availability and handling, the auxiliary agent is preferably a carboxylate.

As long as the auxiliary agent is present in the first polymerization step, the stage at which the auxiliary agent is added is not particularly limited, and examples thereof include the water removal step, the preparation step, or the first polymerization step.

The auxiliary agent may be added to the reaction system as is as the compound described above, such as a carboxylate, or the auxiliary agent may be added to the reaction system in a form of a corresponding organic acid or inorganic acid to allow the compound corresponded to the auxiliary agent to be formed by a neutralization reaction with an alkali metal hydroxide in the reaction system, thereby being present in the first polymerizing step.

The amount of the auxiliary agent is preferably from 0.1 to 50 mol %, more preferably from 1 to 40 mol %, and even more preferably from 5 to 30 mol %, with respect to 1 mol of the sulfur source. When the amount of the auxiliary agent is in the range described above, a high molecular weight PAS is more likely to be obtained.

Phase Separation Agent Addition Step

The phase separation agent addition step is a process of adding a phase separation agent to the reaction mixture after the first polymerization step. The phase separation agent is not particularly limited, and examples thereof include at least one type selected from the group consisting of water, organic carboxylic acid metal salts, organic sulfonic acid metal salts, alkali metal halides, alkaline earth metal halides, alkaline earth metal salts of aromatic carboxylic acids, phosphoric acid alkali metal salts, alcohols, and nonpolar solvents. Among these, water is preferable because of low cost and ease in post-treatment. In addition, a combination of an organic carboxylate and water, in particular, a mixture containing an alkali metal carboxylate and water is preferred. The salts may be in forms obtained by separately adding corresponding acids and bases.

Examples of the nonpolar solvent include hydrocarbon. Since a PAS having a high molecular weight tends to be obtained when a nonpolar solvent does not dissolve the prepolymer to promote reactions between prepolymers, the nonpolar solvent is preferably an aliphatic hydrocarbon, more preferably an alkane (paraffin hydrocarbons), and even more preferably a linear alkane. The number of carbons of the hydrocarbon, aliphatic hydrocarbon, alkane, and linear alkane is not particularly limited as long as the hydrocarbon, aliphatic hydrocarbon, alkane, and linear alkane can be used as a solvent in the second polymerization step. The number of carbons is, for example, from 6 to 24. From the perspective of handling and the like, the number of carbons is preferably from 7 to 20, more preferably from 8 to 18, even more preferably from 9 to 16, and particularly preferably from 10 to 14. Specific examples of the nonpolar solvent include n-hexane, n-heptane, n-octane, isooctane, n-nonane, n-decane, n-dodecane, n-tetradecane, n-hexadecane, n-octadecane, n-eicosane, and n-tetracosane. From the perspectives of ease in obtaining a PAS having a higher molecular weight, and excellent handling and availability, isooctane, n-decane, and n-tetradecane are preferred, and n-decane and n-tetradecane are more preferred.

The used amount of the phase separation agent varies depending on the type of compounds used, but is usually in the range of 1 to 10 mol with respect to 1 kg of the organic polar solvent. In particular, a method of adding water as the phase separation agent in the phase separation agent addition step is preferably adopted so that the water content in the reaction system in the second polymerization step is greater than 4 mol and 20 mol or less with respect to 1 kg of organic polar solvent. In an embodiment of the present invention, the phase separation agent contains water, and the molar ratio of water to the organic polar solvent in the phase separation agent addition step is from 0.5 to 3.0 and, from the perspective of the particle strength, preferably from 0.6 to 2.0, and more preferably from 0.65 to 1.5. The used amount of the phase separation agent in the above range allows the production of the PAS particles having high particle strength in a high yield.

In the case where a mixture containing an alkali metal carboxylate and water is used as the phase separation agent, the used amount of the mixture is preferably adjusted so that the amount of the alkali metal carboxylate is 30 mol or less with respect to 1 mol of the sulfur source. The method for adding a phase separation agent according to the present embodiment is not particularly limited, and examples thereof include a method of adding the total amount of the phase separation agent at one time and a method of adding a phase separation agent a plurality of times.

Second Polymerization Step

The second polymerization step is a process of continuing the polymerization reaction after the phase separation agent addition step. In the second polymerization step, phase separation polymerization is performed in which the polymerization reaction is continued in the presence of the phase separation agent in the state where the reaction system is phase-separated into a concentrated polymer phase and a dilute polymer phase. Specifically, adding a phase separation agent allows the polymerization reaction system (polymerization reaction mixture) to be phase-separated into the concentrated polymer phase (phase mainly containing the molten PAS) and the dilute polymer phase (phase mainly containing the organic polar solvent).

The polymerization temperature in the second polymerization step is heated to 245 to 290° C., preferably 250 to 285° C., and more preferably 255 to 280° C., to continue the polymerization reaction. The polymerization temperature may be maintained at a fixed temperature or may be increased or decreased stepwise as necessary. The temperature is preferably maintained at a fixed temperature from the perspective of controlling the polymerization reaction. The polymerization reaction time is typically in the range of from 10 minutes to 72 hours, and preferably from 30 minutes to 48 hours.

From the perspective of the improvement in yield, the pH of the reaction mixture after the second polymerization step may be from 8 to 11, or may be from 9 to 10.5. The method for adjusting the pH of a reaction mixture is not particularly limited, and examples thereof include a method of adjusting the content of alkali metal hydroxide in the preparation step, or a method of adding alkali metal hydroxide, inorganic acid, and/or organic acid later.

Cooling Step

The cooling step is a process of cooling the reaction mixture after the second polymerization step. In the cooling step, the liquid phase containing the generated polymer is cooled. In the cooling step, the coolant is added to the reaction mixture at a temperature that is at least 5° C. higher than a maximum thickening temperature and lower than 250° C., and a cooling rate at the maximum thickening temperature being 2.2° C./min or higher and 6.0° C./min or lower.

By performing the addition of the coolant to the reaction mixture at a temperature in the range described above and by setting the cooling rate at the maximum thickening temperature to the range described above, the time required for the cooling step to form a granular PAS can be reduced and increase in the average particle size of the resulting granular PAS can be suppressed.

The lower limit of the cooling rate is 2.2° C./min or higher, preferably 2.3° C./min or higher, more preferably 2.4° C./min or higher, even more preferably 2.5° C./min or higher, and particularly preferably 2.6° C./min or higher. When the cooling rate is 2.2° C./min or higher, the time required for the cooling step to form a granular PAS can be reduced and increase in the average particle size of the resulting granular PAS can be suppressed. The upper limit of the cooling rate is not particularly limited and, for example, may be 6.0° C./min or lower, 5.0° C./min or lower, 4.0° C./min or lower, or 3.9° C./min or lower.

In the cooling step, the profile of the cooling rate is not particularly limited as long as the addition of the coolant to the reaction mixture is performed at a temperature in the predetermined range described above and the cooling rate at the maximum thickening temperature is in the range described above. Thus, the cooling rate at the temperature other than the maximum thickening temperature may be, for example, a cooling rate of natural air cooling, and from the perspective of reducing the time of the cooling step, the cooling rate may be identical to the cooling rate at the maximum thickening temperature. Furthermore, for example, in the case where the cooling is performed by using the coolant described below, when the amount of the coolant to be added is limited due to the limitation of the volume of the reactor, cooling rate adjustment may be performed in which natural air cooling is performed first and then, when the temperature of the contents in the reactor is lowered to be close to the maximum thickening temperature, the cooling rate at temperatures higher than the maximum thickening temperature is made identical to the cooling rate at the maximum thickening temperature. At this time, the temperature at which the cooling rate adjustment is performed may be appropriately set based on, for example, the volume of the reactor, and examples thereof include higher than the maximum thickening temperature and (maximum thickening temperature+20° C.) or lower. The temperature at which the cooling rate adjustment is performed may be (maximum thickening temperature+5° C.) or higher and (maximum thickening temperature+15° C.) or lower, may be (maximum thickening temperature+8° C.) or higher and (maximum thickening temperature+12° C.) or lower, and may be maximum thickening temperature+10° C.

In the cooling step, the coolant is added to the reaction mixture at a temperature that is at least 5° C. higher than the maximum thickening temperature and lower than 250° C. Thus, the cooling method by which the cooling rate at the maximum thickening temperature is 2.2° C./min or higher and 6.0° C./min or lower includes at least addition of a coolant to the reaction mixture. The cooling by addition of the coolant and another cooling method may be performed in combination. Such another cooling method is not particularly limited, and examples thereof include forced air cooling by an airflow generator, such as an electric fan or a circulator; circulation of a coolant in a jacket of a polymerization reactor; and refluxing of a gas phase in the reaction mixture by a reflux condenser. Among these, addition of the coolant to the reaction mixture is preferred from the perspective of, for example, preventing the PAS adhesion to a wall of a polymerization reactor due to cooling by the wall. The coolant is not particularly limited and is preferably water and/or ice; and organic polar solvents (e.g., organic amide solvents such as NMP) from the perspective of being easily separated from the PAS in the post-treatment step, and more preferably water and/or ice from the perspective of large specific heat and latent heat of vaporization. In addition, also from the perspectives of facilitating enhancement of phase separation properties of the reaction mixture and facilitating enhancement of the yield of the PAS, the coolant is more preferably water and/or ice.

The content of the coolant in the reaction mixture at the maximum thickening temperature is preferably 2.7 mol or greater and 6.0 mol or less, more preferably 3.0 mol or greater and 5.5 mol or less, and even more preferably 4.0 mol or greater and 5.0 mol or less, with respect to 1 mol of the sulfur source from the perspective of facilitating adequate cooling based on the amount.

In the present specification, the maximum thickening temperature means a temperature at which the agitation torque is the maximum during to the measurement of the agitation torque of the reaction mixture from 240° C. to 220° C. when the reaction mixture after the second polymerization step is cooled from 255° C. by natural air cooling.

Post-Treatment Steps (Such as Separation Step, Washing Step, Recovery Step)

In the method of producing a PAS according to the present embodiment, the post-treatment steps after the polymerization reaction can be performed by common methods, such as the method described in JP 2016-056232 A.

Obtained PAS

The PAS obtained by the method for producing a PAS of the present embodiment has an average particle size of preferably 2000 μm or less, more preferably 1800 μm or less, and even more preferably 1500 μm or less. The lower limit of the average particle size of the PAS is not particularly limited and, for example, may be 200 μm or greater, 300 μm or greater, or 400 μm or greater. Note that, in the present specification, the average particle size means a value measured by sieve analysis in accordance with the description of Examples described below.

The PAS obtained by the method for producing a PAS of the present embodiment has a melt viscosity measured at a temperature of 310° C. and a shear rate of 1216 sec$^{-1}$ of preferably 1000 Pas or less, more preferably 300 Pas or less, and even more preferably 150 Pas or less. The lower limit of the melt viscosity of the PAS is not particularly limited and, for example, may be 1 Pas or greater, 5 Pas or greater, or 8 Pas or greater. Note that, in the present specification, the melt viscosity means a value obtained by measuring at the temperature and the shear rate described above using approximately 20 g of a dry polymer of the PAS and using Capirograph.

The PAS obtained by the method for producing a PAS of the present embodiment can be formed into various injection molded products, or extrusion molded products such as sheets, films, fibers, and pipes, as is or after undergoing oxidative-crosslinking, alone or by blending with various inorganic fillers, fibrous fillers, and various synthetic resins, as desired.

In the method of producing a PAS of the present embodiment, the PAS is not particularly limited and is preferably a PPS.

The present invention is not limited to the embodiments described above, and various modifications are possible within the scope indicated in the claims. Embodiments obtained by appropriately combining the technical means disclosed by the embodiments are also included in the technical scope of the present invention. In addition, all of the documents described in the present specification are herein incorporated by reference.

EXAMPLES

The present invention will be more specifically described hereinafter with reference to examples and comparative examples. Note that the present invention is not limited to these examples. The operation in Examples and Comparative Examples was performed at room temperature, unless otherwise noted. Furthermore, in the present specification, the weight average molecular weight (hereinafter, also referred to as "Mw") means a weight average molecular weight measured by gel permeation chromatography, calibrated with polystyrene standard.

(1) Melt Viscosity

The melt viscosity of the PAS was measured by Capirograph (trade name) 1 D, available from Toyo Seiki Seisakusho, Ltd., equipped with a nozzle of 1.0 mm in diameter and 10.0 mm in length as a capillary. The set temperature was 310° C. A polymer sample was introduced into the apparatus and held for 5 minutes, and then the melt viscosity was measured at a shear rate of 1200 $sec^{-1}$.

(2) Average Particle Size

The average particle size of PAS was measured by using a sieving method in which sieves are used, the sieves having a sieve opening of 2800 μm (7 mesh (mesh count/inch)), a sieve opening of 1410 μm (12 meshes (mesh count/inch)), a sieve opening of 1000 μm (16 meshes (mesh count/inch)), a sieve opening of 710 μm (24 meshes (mesh count/inch)), a sieve opening of 500 μm (32 meshes (mesh count/inch)), a sieve opening of 250 μm (60 meshes (mesh count/inch)), a sieve opening of 150 μm (100 meshes (mesh count/inch), a mesh opening of 105 μm (145 meshes (mesh count/inch), a mesh opening of 75 μm (200 meshes (mesh count/inch), and a mesh opening of 38 μm (400 meshes (mesh count/inch)), and was calculated from masses of substances on each sieves when the cumulative mass is 50% by mass.

Example 1

Water Removal Step

Into a 20 L autoclave, 6005 g of NMP, 2003 g of aqueous sodium hydrosulfide solution (NaSH: purity 62.24 mass %), 1071 g of sodium hydroxide (NaOH: purity 73.40 mass %), and 180 g of sodium acetate were charged. After the inside of the autoclave was purged with nitrogen gas, the temperature of the inside of the autoclave was gradually increased to 200° C. while the inside of the autoclave was stirred by a stirrer at a rotational speed of 250 rpm over about 4 hours to distill off 902 g of water ($H_2O$), 763 g of NMP, and 15 g of hydrogen sulfide ($H_2S$).

First Polymerization Step

After the water removal step, the contents of the autoclave were cooled to 150° C., 3244 g of pDCB, 3302 g of NMP, 8 g of sodium hydroxide, and 107 g of water were added to the autoclave, and after the temperature of the contents of the autoclave was increased to 220° C., the temperature was increased to 260° C. over 1.5 hours while stirring, and thus the first polymerization step was performed. The ratio (g/mol) of NMP to a charged sulfur source (hereinafter, abbreviated as "charged S") in a vessel was 391, pDCB/charged S (mol/mol) was 1.010, and $H_2O$/charged S (mol/mol) was 1.50. The conversion ratio of pDCB in the first polymerization step was 93%.

Phase Separation Agent Addition Step

After the completion of the first polymerization step, while the contents of the autoclave were stirred, 60 g of sodium hydroxide and 445 g of ion-exchanged water were injected, and the rotational speed of the stirrer was increased to 400 rpm. $H_2O$/NMP (mol/mol) was 0.67, and $H_2O$/charged S (mol/mol) was 2.63.

Second Polymerization Step

After the injection of the ion-exchanged water, the temperature of the contents of the autoclave was increased to 265° C., and the reaction was performed for 2.5 hours to perform the second polymerization step.

Cooling Step

After the completion of the second polymerization step, the contents of the autoclave were cooled from 265° C. at a cooling rate of 0.56° C./min by natural air cooling, and at the time when the temperature of the contents reached the maximum thickening temperature+10° C., water at room temperature was injected into the autoclave in a manner that $H_2O$/charged S (mol/mol) was from 2.63 to 5.00 to increase the cooling rate, and then the cooling was performed to room temperature. Note that the cooling rate at the maximum thickening temperature was 2.6° C./min.

Note that the measurement method of the maximum thickening temperature was as follows. It is known that, in a reactor after completion of a polymerization reaction with a phase-separated polymerization system that can produce a high molecular weight PAS, the PAS is present in a molten state and phase-separated into a concentrated polymer phase and a dilute polymer phase by a phase separation agent. When the system is cooled while being stirred, the PAS changes from a molten state to solid and is present as a powdery, particulate, or granular solid in a suspended state, and in this process, viscosity change of the system occurs. That is, when the dispersion system containing the molten PAS is cooled while being stirred, the apparent viscosity of the entire system is gradually increased by the viscosity increase of the PAS as the cooling proceeds, and when the temperature reaches a certain temperature, the apparent viscosity of the entire system decreases. The maximum thickening temperature of this system can be detected as an agitation torque in a certain stirring or as a power supplied to the stirrer. The maximum thickening temperature was measured in advance based on the maximum value of power consumption measured by setting Clamp-on Power Meter CW140 (available from Yokogawa Electric Corporation) on a stirrer motor of the autoclave.

Post-Treatment Step

After the cooling step, the contents of the autoclave were sieved with a screen having an opening diameter of 150 μm (100 meshes), washed with acetone and ion-exchanged water, and then washed with an aqueous acetic acid solution, and dried for 24 hours to obtain the granular PPS. The conditions and the like of the cooling step are shown in Table 1, and the physical properties and the like of the granular polymer are shown in Table 2 (the same applies hereinafter).

Example 2

The granular PPS was obtained in the same manner as in Example 1 except for injecting water with ice in place of the water at room temperature into the autoclave in the cooling step, and starting forced air cooling of the autoclave by an electric fan at the same time as the injection of the water with ice. Note that the cooling rate at the maximum thickening temperature was 3.9° C./min.

Example 3

The granular PPS was obtained in the same manner as in Example 1 except for changing the temperature, at which the water at room temperature was injected, to the maximum thickening temperature+20° C. Note that the cooling rate at the maximum thickening temperature was 2.8° C./min.

Example 4

The granular PPS was obtained in the same manner as in Example 1 except for changing the temperature, at which the water at room temperature was injected, to the maximum thickening temperature+5° C. Note that the cooling rate at the maximum thickening temperature was 2.7° C./min.

Comparative Example 1

The granular PPS was obtained in the same manner as in Example 1 except for cooling the contents of the autoclave from 265° C. to room temperature at a cooling rate of 0.56° C./min by natural air cooling in the cooling step. Note that the cooling rate at the maximum thickening temperature was 0.56° C./min.

Comparative Example 2

The granular PPS was obtained in the same manner as in Example 1 except for allowing the $H_2O$/charged S (mol/mol) to be from 2.63 to 5.00 by injecting water at room temperature into the autoclave immediately after completion of the second polymerization step in the cooling step, to confirm the effect caused by increase of the content of water in the cooling step, and changing the cooling rate at the maximum thickening temperature to 0.54° C./min, which was a value close to that of Comparative Example 1.

Comparative Example 3

The granular PPS was obtained in the same manner as in Example 1 except for performing forced air cooling of the autoclave by an electrical fan in place of injecting water at room temperature into the autoclave in a manner that the $H_2O$/charged S (mol/mol) was from 2.63 to 5.00 in the cooling step, to confirm the effect of the cooling rate, and changing the cooling rate of the maximum thickening temperature to 1.7° C./min.

Comparative Example 4

The granular PPS was obtained in the same manner as in Example 1 except that the cooling rate at the maximum thickening temperature was 1.8° C./min as a result of adjusting the injection speed of water in the cooling step, to confirm the necessary cooling rate to suppress increase of the average particle size of the granular PAS.

Comparative Example 5

The granular PPS was obtained in the same manner as in Example 1 except for setting the water addition temperature to 250° C. in the cooling step to confirm the addition temperature of the coolant that is necessary to suppress increase of the average particle size of the granular PAS, and performing forced air cooling of the autoclave by an electric fan after the addition of water.

TABLE 1

| | $H_2O$/S [mol/mol] (during granulation) | Cooling rate [° C./min] (from maximum thickening temperature to maximum thickening temperature +10° C.) | Maximum thickening temperature [° C.] | Water addition temperature [° C.] | Cooling method (excluding natural air cooling) |
|---|---|---|---|---|---|
| Example 1 | 5.00 | 2.6 | 225 | 235 | Water addition |
| Example 2 | 5.00 | 3.9 | 221 | 235 | Addition of water with ice and forced air cooling |
| Example 3 | 5.00 | 2.8 | 225 | 245 | Addition of water and forced air cooling |
| Example 4 | 5.00 | 2.7 | 225 | 230 | Water addition |
| Comparative Example 1 | 2.63 | 0.56 | 228 | — | None |
| Comparative Example 2 | 5.00 | 0.54 | 237 | — | None |
| Comparative Example 3 | 2.63 | 1.7 | 222 | 235 | Forced air cooling |
| Comparative Example 4 | 5.00 | 1.8 | 228 | 235 | Water addition |
| Comparative Example 5 | 5.00 | 2.6 | 225 | 250 | Addition of water and forced air cooling |

TABLE 2

|  | Melt viscosity [Pa·s] | Mw | Yield [mass %] | Average particle size [μm] | Cooling step Time of reaching 220° C. [minute] |
|---|---|---|---|---|---|
| Example 1 | 115 | 57100 | 92.9 | 1500 | 50 |
| Example 2 | 113 | 57000 | 93.2 | 1500 | 35 |
| Example 3 | 117 | 57400 | 91.7 | 1400 | 45 |
| Example 4 | 116 | 57300 | 92.0 | 1500 | 65 |
| Comparative Example 1 | 137 | 58700 | 86.7 | 2500 | 85 |
| Comparative Example 2 | 125 | 57200 | 91.9 | 2800 | 85 |
| Comparative Example 3 | 126 | 58000 | 87.7 | 2300 | 30 |
| Comparative Example 4 | 116 | 56900 | 92.9 | 2500 | 50 |
| Comparative Example 5 | 113 | 57000 | 91.2 | 2300 | 35 |

As is clear from Tables 1 and 2, according to the method for producing a PAS according to an embodiment of the present invention, the time required for the cooling step to form a granular PAS can be reduced and increase in the average particle size of the resulting granular PAS can be suppressed.

The invention claimed is:

1. A method for producing a polyarylene sulfide, the method comprising:
    a first polymerization step of initiating a polymerization reaction by heating a mixture containing an organic polar solvent, a sulfur source, water, a polyhaloaromatic compound, and an alkali metal hydroxide in the presence of at least one auxiliary agent selected from the group consisting of carboxylate, alkali metal chloride, organic sulfonate, alkali metal sulfate, alkaline earth metal oxide, alkali metal phosphate, and alkaline earth metal phosphate, to form a reaction mixture containing a prepolymer having a conversion rate of a polyhaloaromatic compound of 50 mol % or greater,
    a phase separation agent addition step of adding a phase separation agent into the reaction mixture after the first polymerization step,
    a second polymerization step of continuing the polymerization reaction after the phase separation agent addition step, and
    a cooling step of cooling the reaction mixture after the second polymerization step,
    in the cooling step, a coolant being added to the reaction mixture at a time when a temperature of the reaction mixture is at least 5° C. higher than a maximum thickening temperature and lower than 250° C., and a cooling rate at the maximum thickening temperature being 2.2° C./min or higher and 3.9° C./min or lower,
    the maximum thickening temperature meaning a temperature at which agitation torque is maximum during measurement of the agitation torque of the reaction mixture from 240° C. to 220° C. when the reaction mixture after the second polymerization step is cooled from 255° C. by natural air cooling.

2. The method for producing a polyarylene sulfide according to claim 1, wherein the coolant is water and/or ice.

3. The method for producing a polyarylene sulfide according to claim 1, wherein, at the maximum thickening temperature, a content of the coolant in the reaction mixture is 2.7 mol or greater and 6.0 mol or less with respect to 1 mol of the sulfur source.

* * * * *